United States Patent
Maroney (10) Patent No.: US 8,941,976 B1
(45) Date of Patent: Jan. 27, 2015

(54) CONFIGURABLE POWERLINE ETHERNET ADAPTER AND POWER SUPPLY

(75) Inventor: John E. Maroney, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 137 days.

(21) Appl. No.: 13/012,866

(22) Filed: Jan. 25, 2011

(51) Int. Cl.
H05K 5/00 (2006.01)

(52) U.S. Cl.
USPC ........ 361/637; 361/679.4; 363/142; 363/146; 340/855.9; 439/639; 439/620.31

(58) Field of Classification Search
USPC ................ 361/601, 603, 605, 611, 620–625, 361/636–641, 676, 679.46, 688, 728–731, 361/752, 760
See application file for complete search history.

(56) References Cited

U.S. PATENT DOCUMENTS

| | | | |
|---|---|---|---|
| 6,243,571 B1 | 6/2001 | Bullock et al. | |
| RE37,592 E * | 3/2002 | Alden et al. | 361/622 |
| 6,559,757 B1 | 5/2003 | Deller et al. | |
| 6,653,932 B1 | 11/2003 | Beamish et al. | |
| 7,269,403 B1 | 9/2007 | Miao | |
| 7,542,268 B2 * | 6/2009 | Johnson, Jr. | 361/622 |
| 7,626,489 B2 | 12/2009 | Berkman et al. | |
| 7,750,495 B2 | 7/2010 | Wu et al. | |
| 2001/0011845 A1 * | 8/2001 | Simonelli et al. | 307/66 |
| 2003/0100288 A1 | 5/2003 | Tomlinson, Jr. et al. | |
| 2008/0297339 A1 * | 12/2008 | Mathews et al. | 340/538.16 |
| 2009/0096592 A1 | 4/2009 | Wu et al. | |
| 2009/0154594 A1 | 6/2009 | Yeh et al. | |
| 2009/0268491 A1 * | 10/2009 | Wilson | 363/78 |
| 2010/0284207 A1 * | 11/2010 | Watanabe et al. | 363/126 |

FOREIGN PATENT DOCUMENTS

CN 1937434 A 3/2007

OTHER PUBLICATIONS

Corinex Product Data Sheet from www.corinex.com.
http://www.netgear.com/service-provider/products/powerline-and-coax/powrline/XAVB5501.aspx.
www.lea-networks.com/pdf/9_uk.pdf.

* cited by examiner

Primary Examiner — Courtney Smith (57) ABSTRACT

The embodiments provide a powerline network adapter that allows network communications over power lines while also being configurable to provide other features. In the embodiments, the network adapter can provide a first power outlet, a powerline network adapter, and a wireless access point. The first power outlet serves as a replacement for the outlet consumed by the powerline network adapter and is filtered to reduce or prevent interference with network communications being carried over the powerline. The network adapter is also configurable to provide, among other things, a powerline wired Ethernet interface and a wireless access point that is coupled to the powerline. Furthermore, the network adapter may be configured to provide a second power outlet for a device, such as an external drive. For example, the second power outlet may be an AC/DC 12-Volt power adapter. In some embodiments, this second power outlet is also filtered from the first power outlet.

14 Claims, 8 Drawing Sheets

FRONT VIEW

FIG. 7

"DONGLE" EMBODIMENT

FIG. 8

CONFIGURABLE POWERLINE ETHERNET ADAPTER AND POWER SUPPLY

BACKGROUND

Today, a growing number of residences have a broadband Internet access connection, such as via cable modem, digital subscriber line, fiber, etc. In a given residence, however, there is frequently a plurality of computers and users who wish to share this broadband access connection. Frequently, a residence will deploy a wireless network to provide a shared access to the broadband connection. Unfortunately, wireless networks are often unable to cover the entire residence or building. Also, the signal strength and speed of access can be affected depending on the location and distance of a device from the wireless access point.

Ideally, a residence will also comprise a wired network, such as a fast Ethernet or gigabit Ethernet network. However, wiring a residence with a wired network can be impractical, especially for an older or existing residence, as well as expensive.

One alternative to deploying a separate wired network is to utilize the existing electrical wiring of a residence or building as a network infrastructure. Power line networking has become popular because of its use of the existing wiring and because electrical outlets are widely distributed throughout a residence or building. In order to implement a power line network, a powerline adapter is plugged into the electrical sockets.

Unfortunately, while most power outlets are configured with two or more sockets, plugging a powerline adapter into one socket of an outlet can block or effectively restrict the usage of the other socket. This is because powerline adapters must be bulky in size. This makes use of another electrical device, such as a computer or power strip, difficult. Even if the other socket is available this other device may be particularly problematic because a computer or other high-powered device in the second socket often creates too much noise and interferes with communications over the powerline network.

Accordingly, it would be desirable to provide an improved powerline network adapter for use in a residence or building.

SUMMARY

In an embodiment, a network powerline adapter comprises: an AC plug configured to receive power from a powerline; a filter configured to filter the received power from the powerline and provide a filtered powerline power; at least one AC outlet coupled to the filter and configured to provide a filtered AC power output from the filtered powerline power; at least one network adapter configured to provide an interface for network communications via the AC plug to the powerline; and at least one wired interface for network communications via the network adapter over the powerline. Optionally, the network powerline adapter may also comprise a wireless access point. The wireless access point can be configured to provide at least one wireless interface for network communications via the network adapter over the powerline.

In another embodiment, a powerline network system comprises a powerline network adapter and an external storage drive, such as a hard disk drive (HDD); a solid state drive (SSD); a CD, DVD, or Blu-Ray drive; combinations of the same; or the like. The powerline network adapter comprises an AC plug configured to receive power from a powerline; a filter configured to filter the received power from the powerline and provide a filtered powerline power; at least one AC outlet coupled to the filter and configured to provide a filtered AC power output from the filtered powerline power; a DC outlet configured to provide a DC power output from the filtered powerline power; at least one network adapter configured to provide an interface for network communications via the AC plug to the powerline; at least one wired interface for network communications via the network adapter over the powerline; and, optionally, a wireless access point configured to provide at least one wireless interface for network communications via the network adapter over the powerline. The external drive is powered by the filtered DC outlet and coupled to the wired network interface.

Additional features of the embodiments will be set forth in part in the description which follows, and in part will be obvious from the description, or may be learned by practice of the embodiments. The advantages of the embodiments can be realized and attained by means of the elements and combinations particularly pointed out in the appended claims. It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the invention and together with the description, serve to explain the principles of the embodiments. In the Figures.

DESCRIPTION OF THE EMBODIMENTS

As noted, conventional powerline network adapters are bulky in size and generally block or restrict full usage of the sockets available at an electrical outlet. This is problematic because AC/DC power adapters of most electrical devices also consume usually up to 1 to 1½ outlets. In addition, these electrical devices may cause noise and interfere with communications over the powerline network. Unfortunately, conventional powerline network adapters lack features for isolating or reducing noise from other devices in its proximity.

Accordingly, the embodiments provide systems and methods for an upgradable and configurable design. The embodiments can provide both AC and DC. In addition, the embodiments provide a powerline network adapter is configured to provide for additional features, thus making it upgradeable or configurable. In particular, the powerline network adapter of the embodiments may have a modular architecture that can accommodate different features into a powerline network.

The modular architecture may employ various interfaces, such as USB, to make the powerline network adapter couplable to different modules.

For example, an exemplary adapter may comprise one or more modules that provide a wired Ethernet port as a wireline interface to the powerline network. In addition, the exemplary powerline network adapter may provide a wireless access point, for example, to extend wireless networks throughout a residence or building or to provide a wireless interface to the powerline network. Furthermore, the exemplary powerline network adapter may comprise one or more additional filtered plugs for powering a device, such as an external drive or other device. The additional filtered plugs are configured to prevent other devices, such as a laptop or computer, from corrupting the powerline Ethernet communication link and/or to provide a replacement plug for the one consumed by the powerline network adapter.

In one embodiment, the network adapter can provide a first power outlet, a powerline network adapter, and a wireless access point. The first power outlet serves as a replacement for the outlet consumed by the powerline network adapter and is filtered to reduce or prevent interference with network communications being carried over the powerline. The network adapter is also configurable to provide, among other things, a powerline wired Ethernet interface and a wireless access point that is coupled to the powerline. Furthermore, the network adapter may be configured to provide a second power outlet for a device, such as an external drive. For example, the second power outlet may be an AC/DC 12 Volt power adapter. In some embodiments, this second power outlet is also filtered from the first power outlet.

The embodiments of the present disclosure have several advantages over the prior art. The prior art does not disclose, for example, a powerline Ethernet adapter comprising an AC plug coupled to an AC jack via a power line AC filter. In addition, typical powerline adapters do not have an AC/DC converter coupled to the output of the power line AC filter nor do they provide a DC output voltage for an external device. Moreover, by adding a wireless access point to a powerline Ethernet interface, the embodiments allow upgrading of a NAS storage device outside of the box without additional slots, ports, and cost in the external storage device. Such a feature is absent in conventional powerline network adapters.

Figure 1:
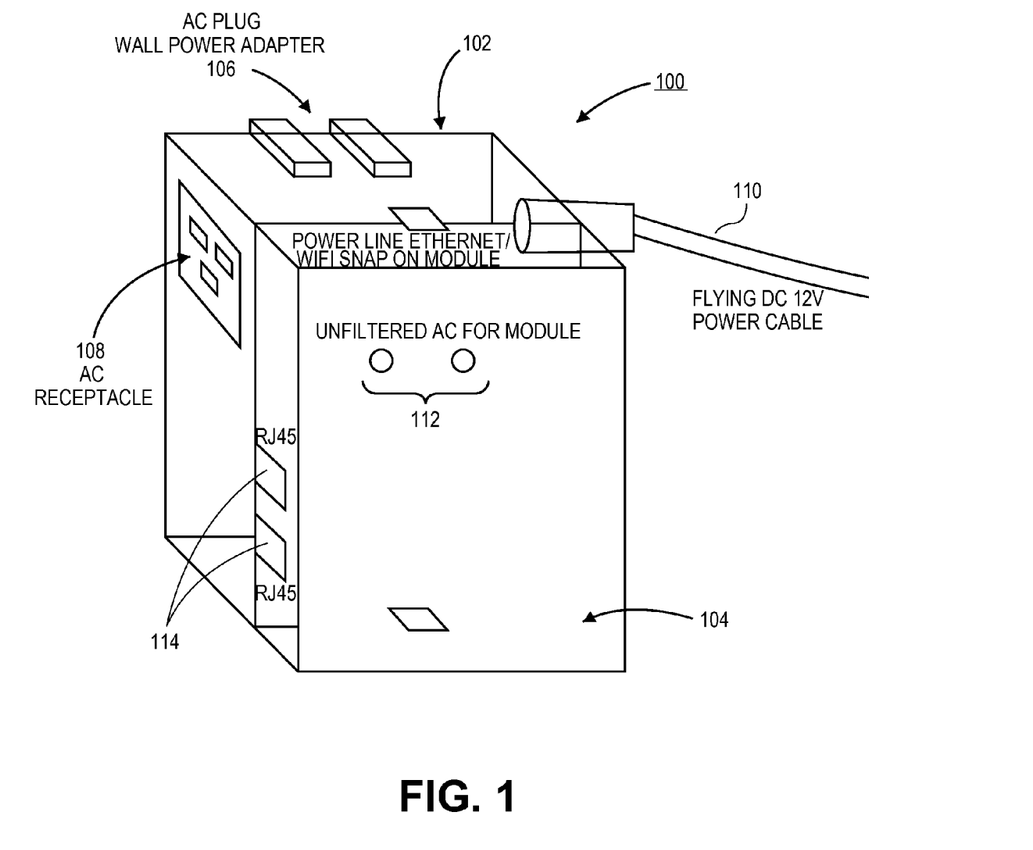
FIG. 1 shows an exemplary form factor for a powerline network adapter that is consistent with the present disclosure.

Various embodiments of the present disclosure will now be described with reference to the accompanying figures, wherein like numerals may refer to like elements throughout. FIG. 1 shows an exemplary form factor for a powerline network adapter that is consistent with the present disclosure.

As shown in FIG. 1, the powerline network adapter may comprise a housing 100 having wall power adapter portion 102, and a network adapter portion 104. The wall power adapter portion 102 may further comprise an AC plug 106, an AC receptacle 108, and provide a DC power output via DC flying cable 110. Network adapter portion 104 may be coupled to the power lines of a site via AC bus 112. In addition, network adapter portion 104 may provide network access to a powerline network via RJ45 jacks 114 and/or wireless access, such as a WiFi access. Each of these components will now be further described below.

Figure 6:
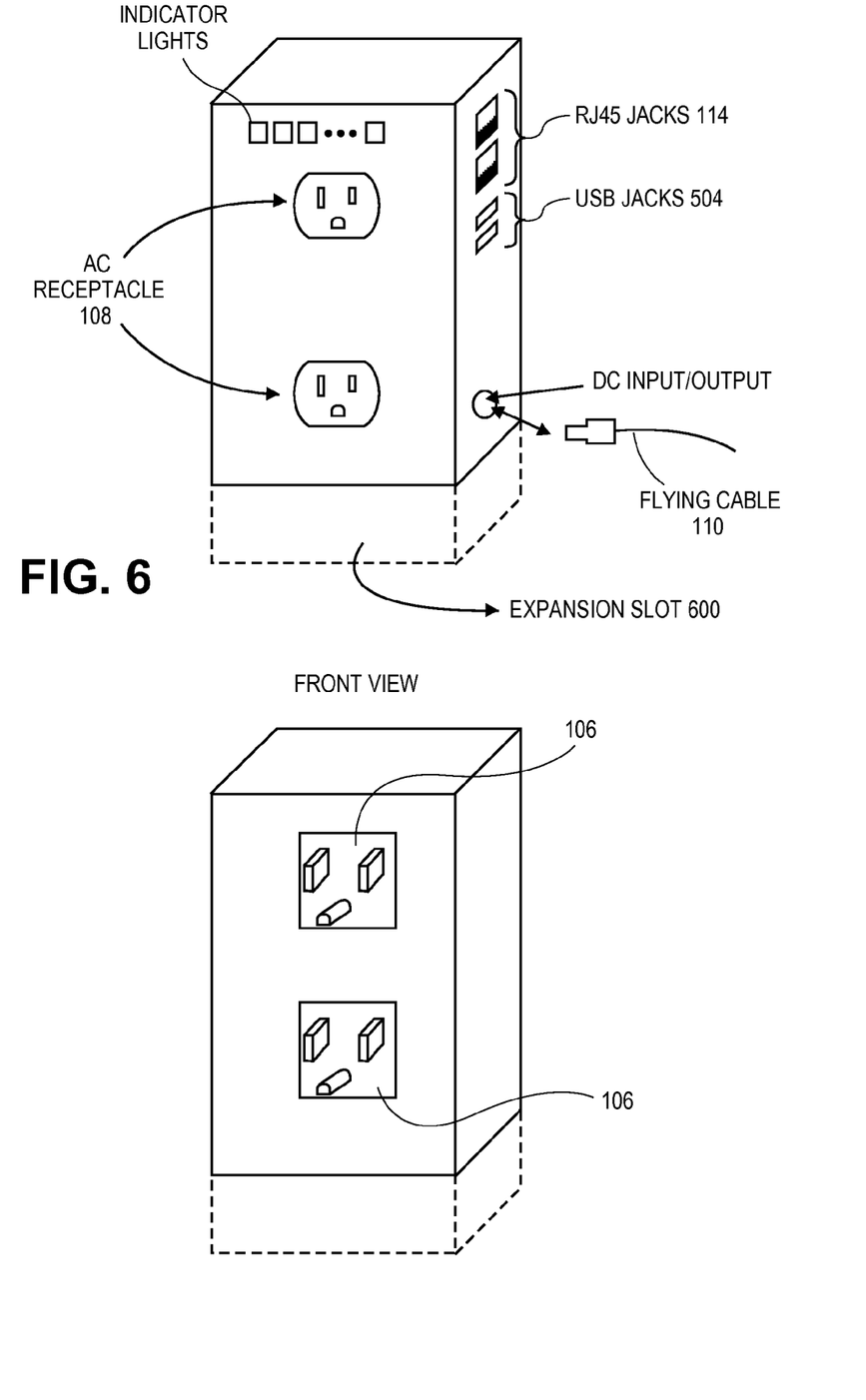
FIG. 6 shows another alternative exemplary form factor for a powerline network adapter.
Figure 7:
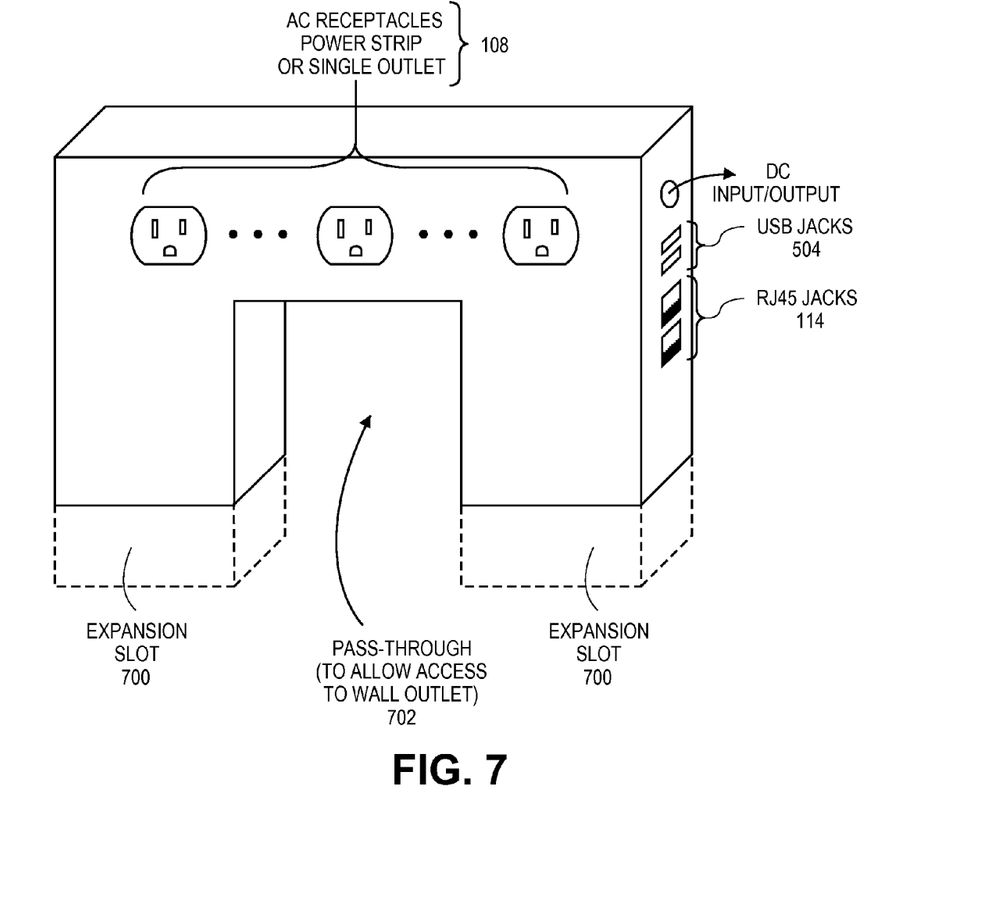
FIG. 7 shows another alternative exemplary form factor for a powerline network adapter.
Figure 8:
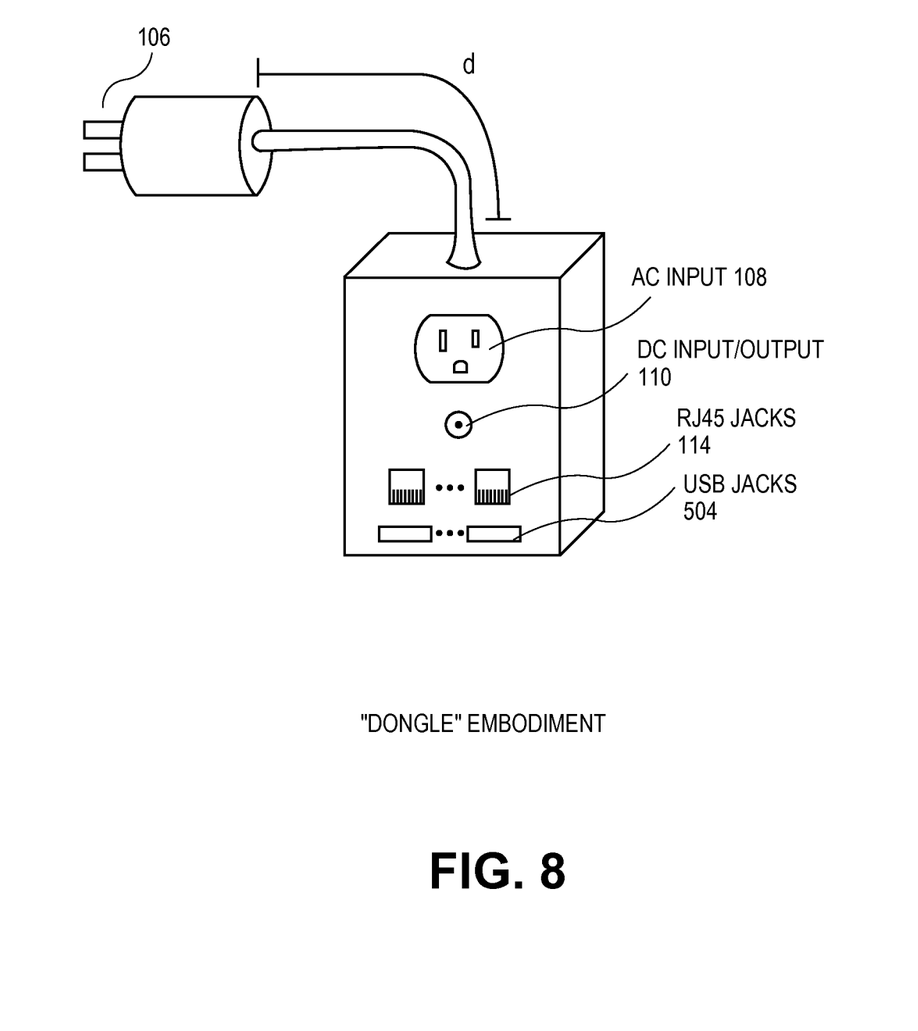
FIG. 8 shows another alternative exemplary form factor for a powerline network adapter.

Housing 100 provides a physical structure for housing the components of the powerline network adapter. Housing 100 may be constructed from well-known materials, such as a plastic, and may also comprise shielding to shield its components. As shown in FIG. 1, the housing 100 may be generally in a block-like form. However, housing 100 may also be provided in other shapes, for example, to preserve access to unused wall outlets, provide better shielding, provide better exposure for wireless signals, etc. Some alternative form factors for housing 100 are shown in FIGS. 6-8.

Wall power adapter portion 102 relates to components that couple the powerline network adapter to a power line of a site. For example, as shown, wall power adapter portion 102 may comprise an AC plug 106 suitable for a wall outlet of a typical residence or building. AC plug 106 thus provides the physical and electrical connection into an outlet (not shown in FIG. 1). In some embodiments, the wall power adapter portion 102 may also provide an AC receptacle 108 to serve as a replacement for the outlet consumed by the powerline network adapter. Such a replacement AC receptacle may be useful because it allows other electrical devices, such as a computer, network attached storage, surge protectors, etc. to be placed in proximity to the powerline network adapter.

For purposes of illustration, AC plug 106 and outlet 108 are shown as a typical Type A, NEMA style outlet and plug that are common in the United States and North America. However, the embodiments may be applied to any style of electrical outlet and plug used worldwide, such as Type B, Type C or Europlug, Type D, Type E, Type F, Type E/F, Type G, Type H, Type I, Type J, Type L, and Type M.

DC flying cable 110 provides a DC power signal to an accompanying device of the powerline network adapter. For example, devices such as an external storage device or network attached storage may be powered by the DC power provided by DC flying cable 110. The DC power connection and flying cable 110 may be considered useful in order to more efficiently provide electrical power to a multitude of devices now common in a residence or site, especially in proximity to a powerline network adapter. Of course, the powerline network adapter may provide a standardized DC input/output jack (not shown in FIG. 1) in order to allow for different types or lengths of the flying cable 110.

Network adapter portion 104 houses the networking components of the powerline network adapter. For example, as shown, the network adapter portion 104 is configured to provide a wireline interface, such as a Gigabit Ethernet RJ45 jack interface 114. In addition, the network adapter portion 104 may serve as a wireless network access point, such as WiFi, WiLAN, etc. wireless access point. In other embodiments, the network adapter portion 104 may comprise several modules for different features added to the wall power adapter portion 102. For example, in other embodiments, the wireline and wireless access point may be housed in separate modules that coupled to each other or to the wall power adapter portion 102. The configuration of modules may depend on various criteria, such as the desired shape for the housing, shielding requirements, noise requirements, etc.

Figure 2:
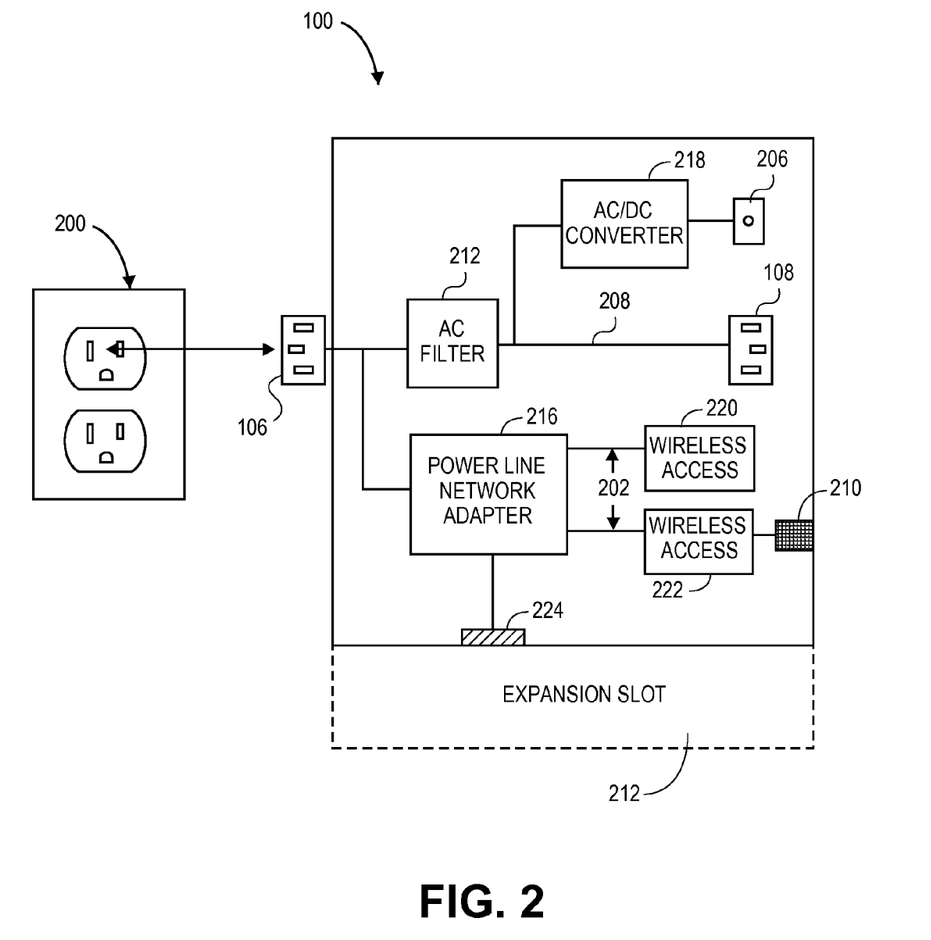
FIG. 2 shows an exemplary block diagram of a powerline network adapter that is consistent with the present disclosure.

FIG. 2 shows an exemplary block diagram of a powerline network adapter that is consistent with the present disclosure. As shown, the powerline network adapter housing 100 may be coupled to the power lines of a residence or building via AC plug 106 connected to an outlet 200. The components of powerline network adapter contained inside of housing 100 will now be further described.

As shown, the powerline network adapter may comprise a network bus 202, an accessory bus 204, a DC input jack 206, a filtered AC outlet 208, a wireline network interface 210, an expansion slot 212, an AC filter 214, a powerline network adapter 216, an AC/DC converter 218, a wireless access point 220, a wireline access controller 222, and an expansion interface 224. These components will now be further described below.

Network bus 202 provides an internal physical media upon which the powerline network adapter may carry its network communications. For example, network bus 202 may be implemented as a Gigabit Ethernet bus, PCI-E bus, a USB bus, a GMII, and the like.

Expansion interface 224 allows for various other communications to be coupled into powerline network adapter processor 216. For example, bus 204 may be a USB, PCI-E, or PCM, etc. bus that allows for connections via expansion interface 224.

DC input jack 206 provides a powered jack for an external device that utilizes DC power. For example, DC input jack 206 may provide a filtered 12 volt DC output power for various devices, such as an external drive, or other type of electrical device. Accordingly, in some embodiments, the adapter is capable of providing DC power to a device as well as AC power.

For example, an external drive may be attached to input jack 206 and flying cable 110 and connected to wireline interface 210 to thus serve as a network-attached storage for the power line network. The embodiments of the adapter may also be coupled to other types of network elements, such as a router, hub, a firewall, a switch, and the like.

Filtered AC outlet 208 provides a powered AC socket for another device that utilizes AC power. Accordingly, AC outlet 208 provides a replacement outlet for the outlet consumed by the adapter. In the embodiment shown, the adapter provides a single AC outlet 208 for the one it consumes. In other embodiments, the adapter 200 provides multiple AC outlets. In these embodiments, the adapter may comprise additional components, such as a surge protector, circuit breaker, etc., to safely accommodate the multiple AC outlets.

Wireline network interface 210 serves as the interface for the power line network. For example, the wireline network interface 210 may be an Ethernet, such as a gigabit Ethernet, interface that is designed for category 5 or 6 cabling. In other embodiments, wireline network interface 210 may provide other types of interfaces, such as a fiber interface, a coaxial cable interface, and the like.

In addition, the adapter is shown providing a single interface 210. In other embodiments, the adapter may comprise multiple interfaces in a hub or switching arrangement.

Expansion slot 212 provides an interface into the adapter for other types of devices. For example, expansion slot 212 may allow the adapter to be upgraded to other devices, such as a firewall, a router, etc. The expansion slot 212 may also allow adapter 200 to be coupled to other types of devices having different connectors.

AC filter 214 filters the raw power signal from outlet 202 to isolate or reduce noise and interference present on the power signal. For example, AC filter 214 may be configured as a low pass, high pass, or band pass filter depending on the desired filtering characteristics. The AC filter 214 may be configured with various operating ranges. For example, the AC filter 214 may have operating ranges up to 30 MHz, 50 MHz, or 100 MHz. In addition, depending on the desired performance, the AC filter 214 may provide various signal-to-noise ratios. For example, the AC filter 214 may be configured to have a frequency versus differential mode insertion loss of about 20 db at 2 MHz and provide about 70-80 db at 30 MHz.

Powerline network adapter 216 serves as a powerline network controller to control network communications over the power line network. In some embodiments, the powerline network adapter 216 is implemented as an IEEE-P1901, Homeplug AV Controller. The adapter 216 may be coupled to the power line network via a transformer (not shown) to configure the power line network communications. In addition, the embodiments may be configured to conform to the IEEE-P1905.1 standard for convergent digital home networking.

In some embodiments, the powerline network adapter 216 may comprise or be coupled to other processing hardware (not shown), such as a general-purpose processor, to provide various functions. For example, if provided, the adapter 216 may provide a configuration interface via a web server to allow a user or administrator to control the configuration of the components in the adapter, such as filtering parameters, wireless access point functions, and wireline access functions. The processing hardware may also provide for various alerting, monitoring, and logging functions. In some embodiments, this information may be stored on an external drive attached to the adapter via wireline interface 210. In other embodiments, the adapter is provided with its own memory or storage to record this information.

AC/DC converter 218 converts the filtered AC output from AC filter 214 into a DC power output. In some embodiments, the AC/DC converter 218 is coupled to the DC input jack 206 via a flying cable and provides a 12-volt/3 ampere DC output. In addition, in some embodiments, the AC/DC converter 218 is configured as a high efficiency power supply, such as an 80% plus power supply unit or other power supply that conforms with ENERGY STAR requirements or Energy Using Products (EuP) Directive Lot 6 requirements.

Wireless access point 220 provides a wireless access and wireless network from adapter 200. For example, wireless access point 220 may provide an 802.11n Wi-Fi network. Of course, wireless access point 220 may provide other types of wireless networks alone or in combination. In some embodiments, wireless access point 220 may be coupled to adapter 216 via a bus, such as a PCI-e or USB 2.0 communications bus. Other types of communications interfaces, such as a PCM IA interface, firewire, etc., may be employed.

Wireline access controller 222 provides the physical access layer services between adapter 216 and wireline interface 210. For example, access controller 222 may be a 0.5 W gigabit Ethernet access bus between adapter 216 and interface 210.

Expansion interface 224 provides adapter 200 a configurable interface or upgrade interface. For example, expansion interface 224 may be a USB 2.0, PCI-e, or PCMIA interface.

Figure 3:
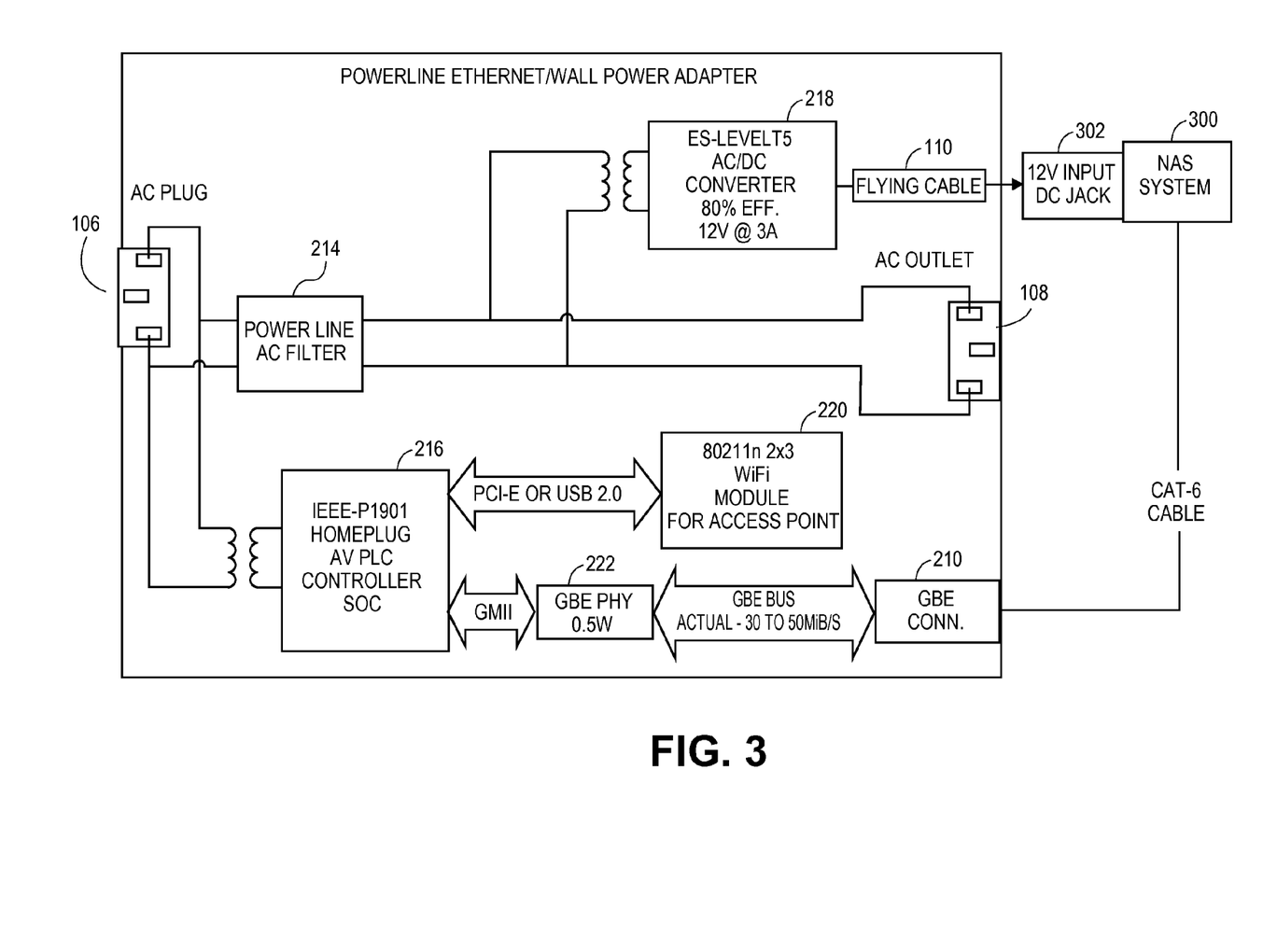
FIG. 3 shows an exemplary block diagram of an embodiment of a powerline network adapter.

FIG. 3 shows an exemplary embodiment of a powerline network adapter. As shown, the adapter is provided with a network attached storage (NAS) 300 that is DC powered via DC flying cable 110. For example, the flying cable 110 may plug into a DC input jack 302 on NAS 300. In addition, the NAS 300 communicates via the wireline interface 210 (i.e., a Gigabit Ethernet connection) back into the powerline network.

As also shown, the adapter may comprise an IEEE P1901 Homeplug AV PLC controller as network powerline adapter processor 216. Such controllers are well-known to those skilled in the art.

In addition, wireless access point 220 may be implemented as an 802.11n WiFi module. Such modules are also well-known to those skilled in the art.

As to network bus 202, it may be implemented based on a Gigabit PHY circuitry, which are well-known to those skilled in the art. As shown, the network bus 202 is implemented using a GMII (Gigabit Ethernet Media Independent Interface) from network adapter processor 216 and a Gigabit Ethernet bus to/from wireline interface 210. As to AC/DC converter 218, it may be implemented using an ES-level 5 converter having about 80% efficiency and providing 12 VDC at 3 amperes.

Figure 4:
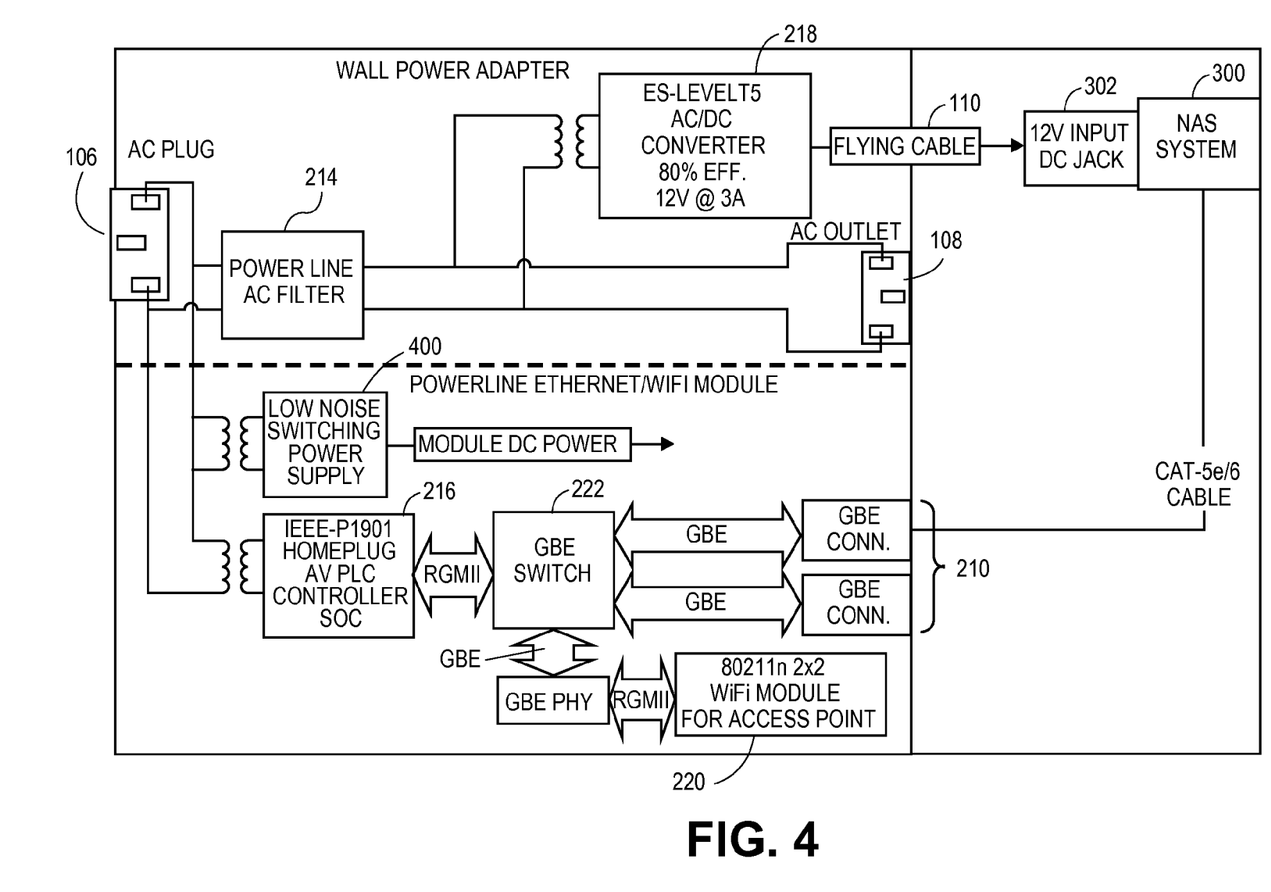
FIG. 4 shows another exemplary block diagram of an embodiment of a power network adapter.

FIG. 4 shows another exemplary embodiment of a power network adapter. As shown, the adapter may be configured differently to now provide a switching DC power supply 400. In addition, network bus 202 may be implemented using a Gigabit Ethernet switch for its wireline access 222. This architecture, for example, allows the adapter to provide a plurality of wireline interfaces 210.

In addition, the wireless access point 220 may be again an 802.11n WiFi access point, but in this embodiment, may be coupled to network adapter processor 216 via a Reduced Gigabit Media Independent Interface (RGMII). Circuitry and logic for such an interface are known to those skilled in the art.

Figure 5:
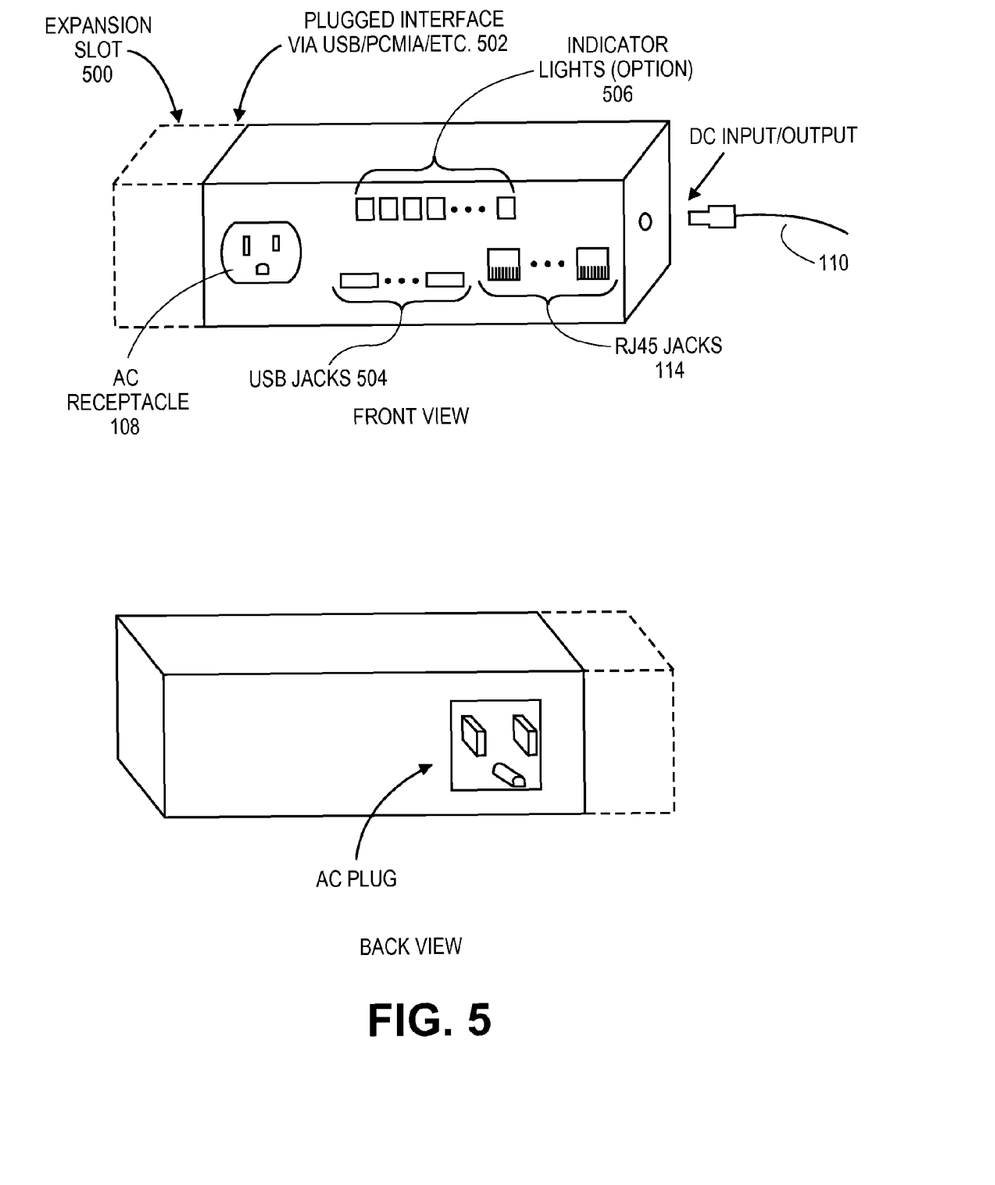
FIG. 5 shows an alternative exemplary form factor for a powerline network adapter.

FIG. 5 shows an alternative exemplary form factor for a powerline network adapter. As shown, the adapter may be configured in a horizontal structure. In this configuration, the adapter has a height, e.g., about 1-1.5 inches, that only consumes a single outlet. Of course, in other countries adhering to different outlet types, the adapter may have different heights to fit appropriately.

In the example shown, the housing 100 may provide a plurality of USB jacks 504 as well as indicator lights 506. USB jacks 504 provide a standardized connection medium, for example, to NAS 400 or other coupled to the adapter. The USB jacks 504 may also allow the adapter to provide additional functionality, such as additional memory, or an interface to other devices such as an external drive.

Indicator lights 506 may provide a visual indication of the status of the adapter. For example, the indicator lights 506 may indicate that the power line of the residence or site is at normal operating conditions. Likewise, indicator lights 506 may indicate that the power line is fluctuating or operating improperly. The indicator lights 506 may also provide indications, such as Ethernet activity, status of a battery backup, or activity by a NAS or other component attached to expansion slot 500, for example.

In this horizontal configuration, the adapter may also provide an expansion slot 500 that extends laterally from a side of the housing 100. The expansion slot 500 allows the adapter to be further configurable. For example, the expansion slot 500 may accommodate other components, such as a wireless router, a battery backup, surge protector, additional connections, and the like.

FIG. 6 shows another alternative exemplary form factor for a powerline network adapter. In the embodiment shown, the housing is now configured in a "vertical" arrangement. Such a shape may be useful in order to preserve horizontal spacing consumed by the adapter. In this vertical configuration, the adapter may provide twin AC receptacles 108 to mimic a conventional wall outlet.

As shown in FIG. 6, the adapter provides its additional functionality on its lateral sides. For example, the adapter may provide RJ45 jacks 114 and USB jacks 504 on its side rather than its front. In the embodiment shown, the adapter, however, may continue to comprise indicator lights 506 on its front side.

In this vertical configuration, the adapter may provide an expansion slot 600 on its bottom (or top) portion. This arrangement allows the adapter to continue to provide access to its underlying wall outlet.

FIG. 7 shows another alternative exemplary form factor for a powerline network adapter. In this embodiment, the housing 100 adapter may be configured in a U-shape or C-shape. Such a shape may be useful, for example, to provide better exposure for a wireless network. The extra area of housing 100 may, for example, allow lengthened wireless antennae to be contained within the housing, thereby avoiding external antennae that could otherwise be susceptible to bending or breakage. As shown, the adapter may have expansion slots 700 that allow the adapter to be configurable with additional features, such as a battery backup, surge protector, additional connectors, etc.

In order to preserve access to outlets, the adapter may have a pass-through portion 702 that allows access to a wall outlet that is not being used by the powerline network adapter. Such a pass-through may thus be useful to preserve access for devices, such as high powered devices like a vacuum cleaner, speakers, etc. that are not part of the powerline network or for devices that do not otherwise need a filtered power signal. In some embodiments, the powerline network adapter may comprise a circuit breaker or other protective feature to protect its components.

In some embodiments, the adapter may be configured with a power strip of multiple AC outlets 108. In addition, the other features, such as RJ45 jacks 114 and USB jacks 504 may be provided on a lateral side of the housing 100.

FIG. 7 shows the housing 100 in a U-shape or C-shaped configuration. However, in the embodiments, the housing 100 may come in other shapes, such as an L-shape, an 0-shape, etc. Such shapes may be selected to preserve wall outlet access, wireless signal reception/transmission, etc.

FIG. 8 shows another alternative exemplary form factor for a powerline network adapter. In this embodiment, the housing 100 provides a cable having fixed length d to its AC plug 106. The housing 100 is thus offset by a flexible distance provided by the cable from a wall outlet. Of note, the fixed length d of the cable ensures proper signal strength for communications over the power line network.

Other embodiments will be apparent to those skilled in the art from consideration of the specification and practice of the embodiment disclosed herein. For example, adapter 200 may comprise a battery backup, a surge protector, and the like. In addition, the adapter 200 may comprise various visual and audio indicators to indicate the status of the power line network or devices to which it is coupled. It is intended that the specification and examples be considered as exemplary only, with a true scope and spirit of the embodiment being indicated by the following claims.

What is claimed is:

1. A network powerline adapter, said adapter comprising:
   an AC plug shaped to consume a single outlet of a powerline outlet and receive power from the powerline outlet, wherein the AC plug is shaped to allow use of another outlet of the powerline outlet;
   a filter, coupled to the AC plug, that receives the received power from the powerline and provides a filtered powerline power;
   at least one AC plug outlet, coupled to the filter, that provides a filtered AC power output for the filtered powerline power;
   at least one network adapter, coupled to the AC plug, that provides an interface for network communications via the AC plug to the powerline; and
   at least one wired interface, coupled to the at least one network adapter, for network communications via the network adapter over the powerline.

2. The adapter of claim 1 further comprising a DC outlet that provides a DC power output from the filtered powerline power.

3. The adapter of claim 2 wherein the DC outlet provides a 12 Volt DC power output.

4. The adapter of claim 1 wherein the network adapter is a HomePlug AV compliant network adapter.

5. The adapter of claim 1 wherein the wired interface comprises a Gigabit Ethernet interface.

6. The adapter of claim 1 further comprising a wireless access point that provides a WiFi wireless interface.

7. A network powerline adapter, said adapter comprising:
- a casing shaped to provide a single AC plug that consumes a single outlet of a powerline outlet and receives power from the powerline outlet, wherein the casing is shaped to allow use of another outlet of the powerline outlet;
- a filter, coupled to the AC plug, to filter the received power from the powerline and provide a filtered powerline power;
- at least one AC plug outlet, coupled to the filter, that provides a filtered AC power output for the filtered powerline power;
- at least one network adapter, coupled to the AC plug, that provides an interface for network communications via the AC plug to the powerline; and
- at least one wired interface for network communications via the network adapter over the powerline.

8. The adapter of claim 7 wherein the casing provides an expansion slot for a USB interface to the network adapter.

9. The adapter of claim 7 wherein the casing provides an expansion slot for a PCI interface to the network adapter.

10. The adapter of claim 7 wherein the casing provides an expansion slot for an additional wired network interface.

11. The adapter of claim 7 further comprising a wireless access point configured to provide at least one wireless interface for network communications via the network adapter over the powerline.

12. A powerline network system, said system comprising:
- a powerline network adapter comprising: an AC plug shaped to receive power from a powerline outlet;
- a filter, coupled to the AC plug, that receives the received power from the powerline and provides a filtered powerline power;
- at least one AC plug outlet, coupled to the filter, providing a filtered AC power output from the filtered powerline power;
- a DC outlet shaped to provide a DC power output from the filtered powerline power to at least one network adapter, wherein the at least one network adapter is coupled to the AC plug and provides an interface for network communications via the AC plug to the powerline;
- at least one wired interface for network communications via the network adapter over the powerline;
- a wireless access point that provides at least one wireless interface for network communications via the network adapter over the powerline; and
- an external drive coupleable to the DC outlet and the wired network interface to serve as a network attached storage unit for the powerline network system.

13. The system of claim 12, wherein the external drive is powered by a 12 Volt DC outlet from the network adapter.

14. The system of claim 12, wherein the external drive is coupled to the wired network interface via a Gigabit network interface.

* * * * *